(12) United States Patent
Bosselmann et al.

(10) Patent No.: US 9,518,874 B2
(45) Date of Patent: Dec. 13, 2016

(54) TEMPERATURE SENSOR ARRANGEMENT

(75) Inventors: Thomas Bosselmann, Marloffstein (DE); Emil Brutsch, Bergisch Gladbach (DE); Michael Willsch, Jena (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 416 days.

(21) Appl. No.: 14/126,435

(22) PCT Filed: May 30, 2012

(86) PCT No.: PCT/EP2012/060168
§ 371 (c)(1),
(2), (4) Date: Dec. 15, 2013

(87) PCT Pub. No.: WO2012/171799
PCT Pub. Date: Dec. 20, 2012

(65) Prior Publication Data
US 2014/0133518 A1   May 15, 2014

(30) Foreign Application Priority Data

Jun. 17, 2011  (DE) .................. 10 2011 077 723

(51) Int. Cl.
*G01K 13/02* (2006.01)
*G01K 11/32* (2006.01)

(52) U.S. Cl.
CPC ........... *G01K 11/3206* (2013.01); *G01K 13/02* (2013.01); *G01K 2013/024* (2013.01)

(58) Field of Classification Search
None
See application file for complete search history.

(56) References Cited

U.S. PATENT DOCUMENTS

2009/0169150 A1    7/2009  Xia
2010/0290733 A1*  11/2010  Xia ...................... F01D 17/085
                                                    385/12

FOREIGN PATENT DOCUMENTS

| DE | 102010016825 A1 | 11/2010 |
| GB | 2441408 A | 3/2008 |
| WO | 2010114650 A1 | 10/2010 |

* cited by examiner

*Primary Examiner* — Erica Lin
(74) *Attorney, Agent, or Firm* — Beusse Wolter Sanks & Maire

(57) ABSTRACT

A temperature sensor arrangement for gas turbines is provided. The temperature sensor arrangement has a measuring probe. The measuring probe has a bore in which a steel tube is guided so as to be axially movable. The steel tube includes a glass fibre having Bragg grating measurement points for measuring the temperature. Elongate measurement openings enable hot gas to flow through the measuring probe, flowing round the steel tube in the region of the Bragg grating.

15 Claims, 2 Drawing Sheets

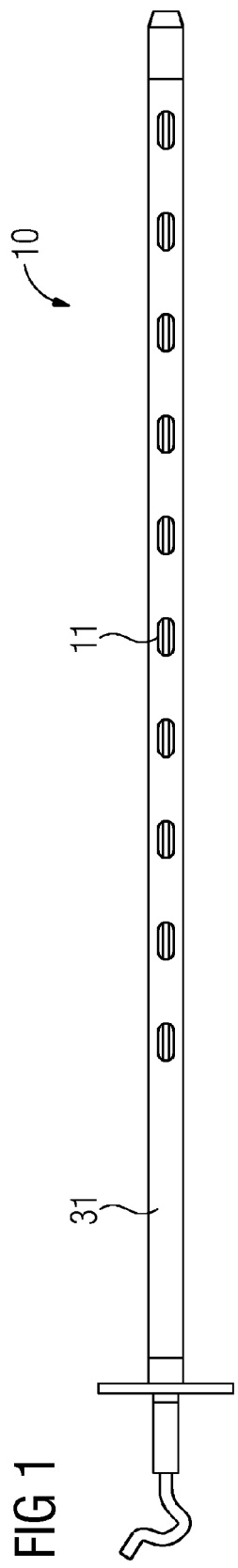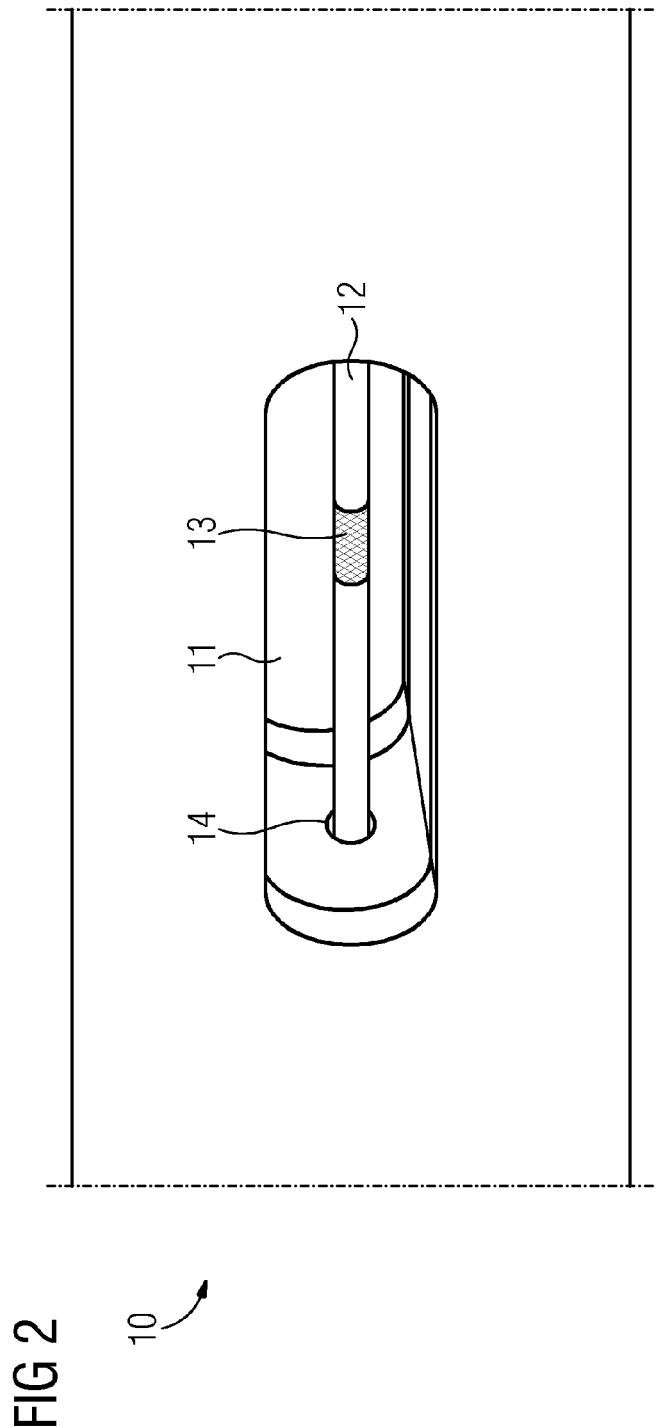

TEMPERATURE SENSOR ARRANGEMENT

CROSS REFERENCE TO RELATED APPLICATIONS

This application is the U.S. National Stage of International Application No. PCT/EP2012/060168 filed May 30, 2012, and claims the benefit thereof. The International Application claims the benefit of German Application No. DE 102011077723.7 filed Jun. 17, 2011. All of the applications are incorporated by reference herein in their entirety.

FIELD OF INVENTION

The invention relates to a temperature sensor arrangement for use in a gas turbine. The temperature sensor arrangement is based on Bragg grating measurement points in an optical waveguide.

BACKGROUND OF INVENTION

With gas turbines, in particular ones having so-called silo combustion chambers, it is of interest to have an indicator for a disturbance to combustion processes at one or more of the burners. Instances of local overheating can, specifically, have negative effects on the service life of the gas turbine, for example. Since the direct measurement of the temperature distribution at the burners is difficult owing to the high combustion temperatures, the temperature measurement is carried out indirectly by measuring the exhaust gas temperature distribution. This is possible because the temperature distribution in the burner region is continued qualitatively via the gas flow as far as into the exhaust gas channel.

SUMMARY OF INVENTION

It is an object of the present invention to specify a measurement arrangement which enables an accurate detection of exhaust gas temperatures in a gas turbine.

This object is achieved by a measurement arrangement described herein.

An embodiment of a temperature sensor arrangement for a gas turbine comprises a support tube with a bore in an axial direction, a guide element arranged movably in an axial direction in the bore, and an optical waveguide arranged in the guide element and having at least one Bragg grating measurement point.

In other words, the actual sensor in the form of the Bragg grating measurement points in the optical waveguide is fitted in its guide element in the interior of a support tube and supported and held by the latter.

Here, the guide element, preferably a steel tube, is, however, movably arranged, the result being reduction or avoidance of mechanical influences on the Bragg grating measurement points by changes to the support tube, for example.

A temperature sensor arrangement is thereby provided which is suitable for use in gas turbines and enables a distributed temperature measurement with, for example, 10 or 20 Bragg grating measurement points in a single waveguide.

It is preferred to provide measurement openings in the support tube in a fashion transverse to the axial direction in order to enable hot measurement gas to access the guide element, and thus the Bragg grating measurement points. In this case, the holes are preferably elongate and penetrate the support tube.

The guide element is preferably arranged in the support tube such that the Bragg grating measurement points are arranged in the region of the measurement openings. It is particularly preferred when the Bragg grating measurement points are arranged centrally in the measurement openings.

In a preferred refinement, the optical waveguide is a glass fiber. In particular, the optical waveguide is a glass fiber without coating inside the guide element.

The support tube expediently has a length of at least 50 cm, in particular a length of 2 m or 3 m. By contrast, the bore has a diameter of preferably between 1.5 mm and 2.5 mm. With the specified dimensions, it is very difficult to implement the bore over the entire length of the support tube. Consequently, in an advantageous refinement of the invention the support tube is composed of an outer part and an inner part.

In an alternative, the inner part is composed in this case of segments. The length of the individual segments is governed in this case by the possibility of implementing a bore of diameter in the range of 2 mm. For example, the length of the segments is 30 cm.

The segments preferably have openings for alignment pins by means of which they can be oriented and plugged together. This enables a simple and accurate assembly.

In a second alternative, the inner part, in turn, has a plurality of inner tubes arranged one inside another, of which the innermost has the bore.

Given a division into outer part and inner part, both the segments and/or the inner tubes and the outer part preferably have the measurement openings, already described, transverse to the axial direction. It is expedient in this case for the measurement openings to be respectively arranged in such a way that continuous openings are produced in the assembled state.

The measurement openings, in particular those of the outer part, are preferably rounded off at their outer edges in order to minimize the occurrence of instances of turbulence.

BRIEF DESCRIPTION OF THE DRAWINGS

Preferred, but by no means restrictive exemplary embodiments of the invention will now be described in more detail with the aid of the figures of the drawing. The features are illustrated schematically in this case. In the drawing:

FIG. 1 shows an exemplary measurement lance with 10 fiber Bragg grating (FBG) measurement points, FIG. 2 shows a section of the measurement lance in the region of an FBG measurement point.

DETAILED DESCRIPTION OF INVENTION

Figure 3:
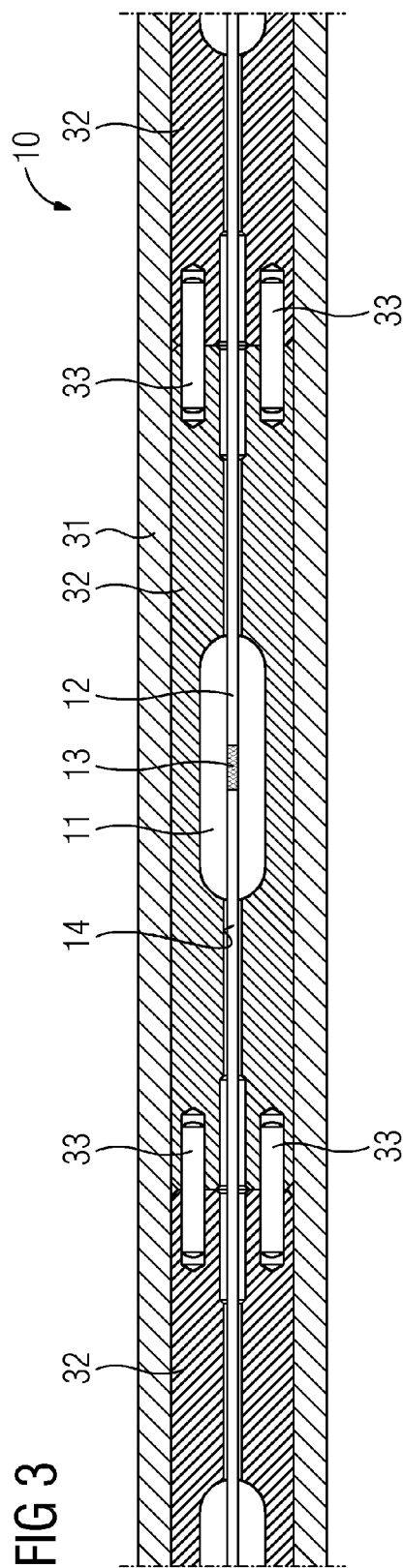
FIG. 3 shows a cross section through the construction of the measurement lance.

FIG. 1 shows a measurement lance 10 in accordance with a first exemplary embodiment in its entirety. Apart from the cable routing, it comprises, inter alia, an outer tube 31 into which elongate measurement openings 11 are introduced at regular intervals. The measurement lance 10 is 3 m long and comprises 10 measurement openings 11 with a respective FBG measurement point 13.

FIG. 2 shows an enlarged section of the measurement lance 10. The enlarged section shows a measurement opening 11 which penetrates the entire measurement lance 10 transversely. The outer edge of the measurement opening 11 is rounded off in order to reduce instances of turbulence. The measurement gas can thus advantageously flow through the measurement lance 10 at a point. In this case, the measurement gas, that is to say, for example, the exhaust gas in a turbine, also flows past a steel tube 12 which is guided movably in the center of the measurement lance 10 in a bore 14. The steel tube 12 has a fiber Bragg grating measurement point 13 in the region of the center of the measurement opening 11.

The sectional drawing of FIG. 3 shows the construction of the measurement lance 10 more accurately. The measurement lance 10 has the outer tube 31 for the purpose of mechanical stabilization. The outer tube 31 extends over virtually the entire length of the measurement lance 10.

In the interior of the outer tube 31, the measurement lance 10 has a series of 10 inner segments 32. The inner segments 32 are plugged into one another and oriented by means of alignment pins 33. At their center, the inner segments 32 have the bore 14 in which the steel tube 12 is guided. The diameter of the bore 14 is selected in this case such that the steel tube 12 remains axially movable. In the present exemplary embodiment, the diameter of the bore 14 is 2 mm, while the diameter of the steel tube 12 is 1.5 mm.

In analogy with the outer tube 31, the inner segments 32 have measurement openings 11 and are arranged such that continuous measurement openings 11 result in the measurement lance 10.

Figure 4:
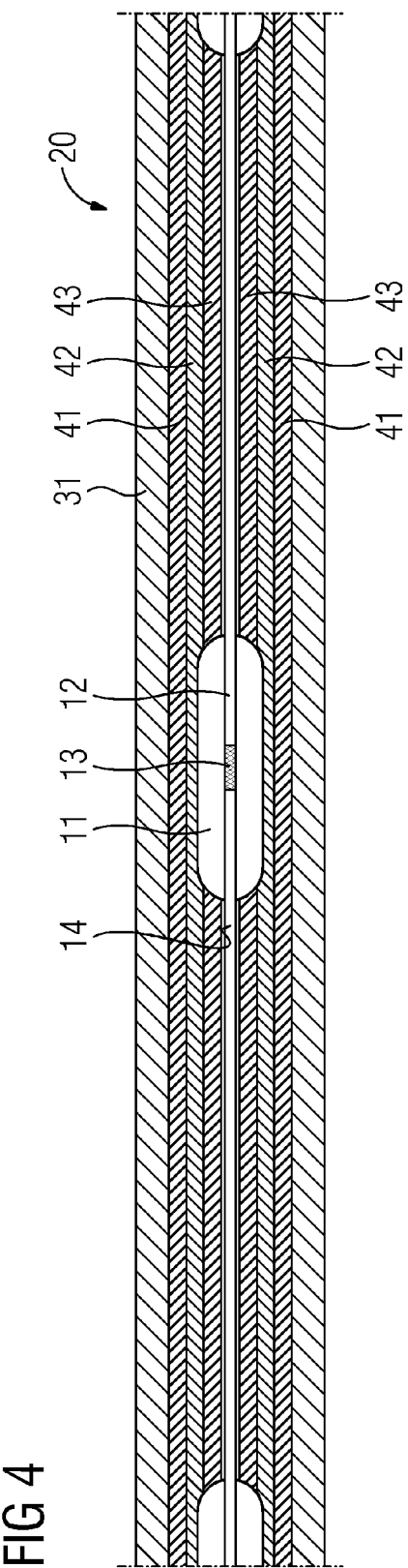
FIG. 4 shows a cross section through the construction of a further measurement lance.

FIG. 4 shows an alternative construction in accordance with a second exemplary embodiment of a second measurement lance 20. In analogy with the first measurement lance 10, the second measurement lance 20 has an outer tube 31. However, further tubes 41, 42, 43 are arranged concentrically in the outer tube 31. Said inner tubes 41, 42, 43 fill the outer tube 31 up to a region which corresponds to the bore 14. The concentric construction of individual inner tubes 41, 42, 43 is selected in this case since it is not technically possible in practice to implement a thin bore 14 of a diameter of approximately 2 mm over a length of 3 m in a massive tube of a diameter of, for example, 3 cm. Just as with the first measurement lance 10, measurement openings 11 are provided through all the outer and inner tubes 31, 41, 42, 43 so as to produce continuous measurement openings 11 in the measurement lance 10. Just as in the case of the first measurement lance 10, the steel tube 12 is pushed into the inner tubes 41, 42, 43 together with the fiber Bragg grating measurement points 13.

The invention claimed is:

1. A temperature sensor arrangement for a gas turbine, comprising
a support tube comprising a bore in an axial direction, an outer part, and an inner part composed of segments, the segments respectively having at most half a length of the outer part,
a guide element arranged movably in an axial direction in the bore, and
an optical waveguide arranged in the guide element and having at least one Bragg grating measurement point.

2. The temperature sensor arrangement as claimed in claim 1, wherein the support tube has measurement openings transverse to the axial direction in order to enable hot measurement gas to access the guide element, and thus the Bragg grating measurement points.

3. The temperature sensor arrangement as claimed in claim 1, wherein the guide element is arranged in the support tube such that the Bragg grating measurement points are arranged centrally in the measurement openings.

4. The temperature sensor arrangement as claimed in claim 1, wherein the optical waveguide is a glass fiber.

5. The temperature sensor arrangement as claimed in claim 1, wherein the segments have openings for alignment pins by means of which the segments can be oriented and plugged together.

6. The temperature sensor arrangement as claimed in claim 5, wherein the segments and the outer part have openings transverse to the axial direction arranged in such a way that the continuous measurement openings are produced in the assembled state with the outer part.

7. The temperature sensor arrangement as claimed in claim 2, wherein the measurement openings are rounded off at their outer edges.

8. The temperature sensor arrangement as claimed in claim 1, wherein the guide element is a steel tube.

9. The temperature sensor arrangement as claimed in claim 1, wherein the bore has a diameter of between 1.5 mm and 2.5 mm.

10. The temperature sensor arrangement as claimed in claim 1, wherein the optical waveguide is a glass fiber without coating in the region of the guide element.

11. A temperature sensor arrangement for a gas turbine, comprising
a support tube comprising an inner part and an outer part, the support tube defining a bore in an axial direction and measurement openings transverse to the axial direction,
a guide element arranged movably in an axial direction in the bore, and
an optical waveguide arranged in the guide element and comprising at least one Bragg grating measurement point,
wherein the guide element is arranged in the support tube such that the Bragg grating measurement points are disposed in the measurement openings.

12. The temperature sensor as claimed in claim 11, wherein the inner part comprises segments comprising openings for alignment pins by which the segments can be oriented and plugged together.

13. The temperature sensor as claimed in claim 11, wherein the inner part has a plurality of concentrically arranged inner tubes of which the innermost comprises the bore.

14. The temperature sensor as claimed in claim 11, wherein the measurement openings are rounded off at their outer edges.

15. The temperature sensor as claimed in claim 11, wherein the guide element comprises a steel tube.

* * * * *